US010223864B2

(12) United States Patent
Ditton

(10) Patent No.: US 10,223,864 B2
(45) Date of Patent: Mar. 5, 2019

(54) ELECTRONIC GAMING MACHINE AND METHOD FOR DETECTING PLAYER EMOTION AND GENERATING SENSORY OUTPUT

(71) Applicant: Incredible Technologies, Inc., Vernon Hills, IL (US)

(72) Inventor: Richard A. Ditton, Kildeer, IL (US)

(73) Assignee: INCREDIBLE TECHNOLOGIES, INC., Vernon Hills, IL (US)

( * ) Notice: Subject to any disclaimer, the term of this patent is extended or adjusted under 35 U.S.C. 154(b) by 382 days.

(21) Appl. No.: 14/248,688

(22) Filed: Apr. 9, 2014

(65) Prior Publication Data

US 2014/0302927 A1 Oct. 9, 2014

Related U.S. Application Data

(60) Provisional application No. 61/809,970, filed on Apr. 9, 2013.

(51) Int. Cl.
*A63F 13/21* (2014.01)
*G07F 17/32* (2006.01)

(52) U.S. Cl.
CPC ...... *G07F 17/3239* (2013.01); *G07F 17/3237* (2013.01); *G07F 17/3269* (2013.01)

(58) Field of Classification Search
CPC ...................................................... G06F 15/16
See application file for complete search history.

(56) References Cited

U.S. PATENT DOCUMENTS 8,157,650 B2 * 4/2012 Grant ...................... G06F 3/016 463/20
2003/0228902 A1 * 12/2003 Walker .................... G07F 17/32 463/25
2009/0270170 A1 * 10/2009 Patton ..................... A63F 13/10 463/36
2012/0157204 A1 * 6/2012 Kelsey .................. A63F 13/211 463/34
2012/0311032 A1 * 12/2012 Murphy .............. G07F 17/3225 709/204

* cited by examiner

*Primary Examiner* — Dmitry Suhol
*Assistant Examiner* — Ankit Doshi
(74) *Attorney, Agent, or Firm* — Husch Blackwell LLP; George S. Pavlik

(57) ABSTRACT

An electronic gaming machine and method for detecting player emotion and generating sensory output. The machine and method featuring a processor, control circuitry and instructions stored on a computer readable medium. The instructions being executable by the processor to execute a game program and having stored data associating a player condition with a predetermined sensory output. During play of the game, the processor registering information regarding a detected condition, comparing the information to the stored data and implementing the sensory output where the information is associated with the predetermined sensory output.

26 Claims, 2 Drawing Sheets

ELECTRONIC GAMING MACHINE AND METHOD FOR DETECTING PLAYER EMOTION AND GENERATING SENSORY OUTPUT

CROSS REFERENCE TO RELATED APPLICATION

This application claims the benefit of U.S. Provisional Patent Application Ser. No. 61/809,970 filed Apr. 9, 2013, the entirety of which is hereby incorporated by reference as if fully set forth herein.

FIELD

The subject invention pertains to a gaming machine and associated method and more particularly to a machine and method that can detect and monitor a player's emotion during play and generate sensory output or feedback responsive to a detected emotion.

BACKGROUND

Electronic gaming machines ("EGMs") are generally well known and have been relatively popular for a number of years. Examples of such machines include for example, video slot machines, video poker machines, bar-top gaming devices, and coin-operated amusement devices. Such gaming devices typically have fixed rules for play which control the probability and volatility of winning outcomes. Once such rules are in operation, they usually cannot be readily changed very much, if at all, without a great deal of effort and expense, especially in regulated jurisdictions. Such circumstances generally make it difficult to offer incentives to a player to continue playing if the player does not find the current configuration entertaining or enjoyable.

In instances where a player loses interest in a game, the player may be more likely to stop playing and perhaps also be less likely to play the game again in the future. Such loss of interest can result in certain gaming machines being inactive for extended periods of time. As such machines are typically income producing, periods of inactivity can result in a loss of revenue for the gaming establishment. Thus, game developers and owners/operators are continually in need of new game concepts or features to generate and maintain player interest.

Where an individual is engaged in an activity that involves a machine, article or device, in certain instances, the individual's physical interaction with such article a can be a gauge or indication of their interest in the particular activity. For instance, where an individual is keenly interested in a particular activity, such as for example a game of bowling, the pace of play may be more rapid or continuous or the force in which the ball is thrown or in which it strikes the pins may be greater or more intense. By contrast, where the individual interest is the game is only tepid, he or she may play at a slower pace and not apply as much force to the ball. Thus, by monitoring and detecting the individual's behavior or activity, certain conclusions may be able to be drawn as to their emotion or attentiveness. In addition, where the individual's detected level of attentiveness or emotion is not at an optimal or desired level, certain stimuli or output may be able to be introduced or provided to in order to stimulate interest or achieve a particular heightened level of attentiveness.

In view of the foregoing, it would be useful, and thus there is a need, to incorporate behavior or activity recognition and response functionality in connection with gaming machines in order to monitor the player emotion and to implement stimuli or other output to generate or maintain continued interest in the game should the player's detected emotion be diminished or reduced. It will be understood by persons of ordinary skill in the art that such practices can provide for a more entertaining and enjoyable gaming experience to players and can further contribute to increased play of gaming machines and increased revenues for owners/operators of such machines.

DETAILED DESCRIPTION

Figure 1:
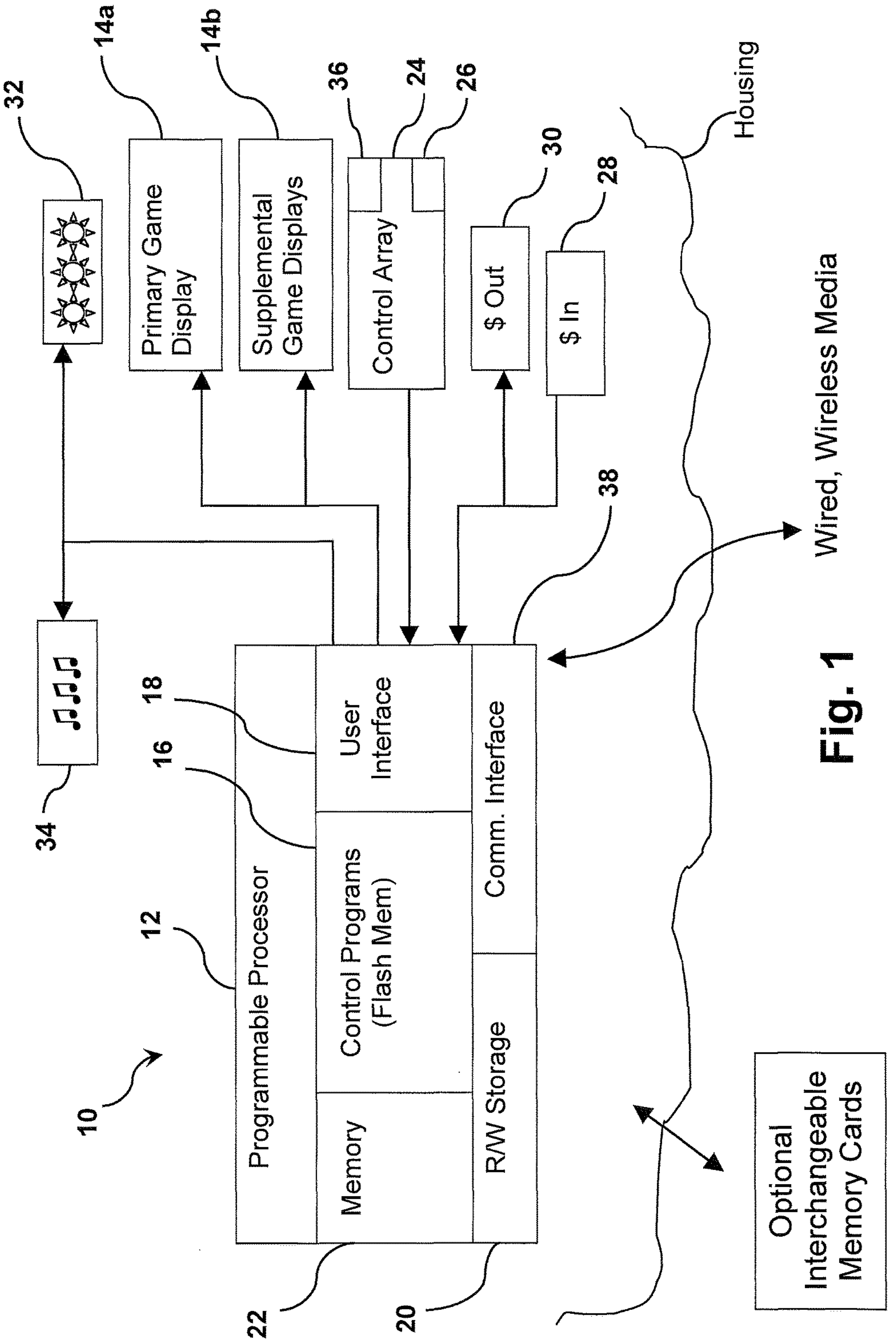
FIG. 1 is a block diagram illustrating a representational view of a machine in accordance herewith.

While this invention is susceptible of embodiment in many different forms, there are shown in the drawings and will be described herein in detail specific embodiments thereof with the understanding that the present disclosure is to be considered as an exemplification of the principles of the invention and is not intended to limit the invention to the specific embodiments illustrated.

As described herein, embodiments of the subject invention are directed to an electronic gaming machine (hereinafter "EGM") and method that can detect and monitor a player's emotion during play of a game and generate sensory output, feedback or other stimuli responsive to a detected emotion. Generally, embodiments presented herein provide for an EGM or associated device that can be controlled by one or more programmable processors that can detect and/or monitor a player's emotional condition based on the player's behavior, activity and interaction with the EGM. Such detection and monitoring can be derived not only from absolute signaling from the player (for example, specific input or play choices from the player such as "play again," "increase bet," "cash out," etc.), but also from relative patterns or timing of such signaling. For example, the EGM can measure the time interval between a single play or "pull" coming to an end and the player pressing the "play again" button, how often the player changes his/her wagers, the time it takes the player to select a play choice or any other relative measurement of the current individual player's actions. Embodiments can further include an EGM having sensors that can measure a player's physical exertion on the EGM, such as for example, how much force the player actuates a button, lever, touch screen, pad or other input control device provided as part of the machine's user interface.

It will be recognized that analytic information associated with the player's input or physiological condition or activity can be evaluated against predetermined criteria locally stored to a suitable storage means of the EGM such as a hard drive, flash drive, or that such information regarding the player's input can be transmitted to a remote processor, server or other electronic device for evaluation. Such evaluation can be performed by analyzing or comparing the analytic information from a player's input to stored data, thresholds, or ranges associated with at least one emotional condition.

Once the relative behavior of the current individual player is detected, the EGM can use predetermined algorithms in order to make changes to the play experience which do not affect the regulated portions of game play. Embodiments presented herein can also implement artificial intelligence ("AI") systems to evaluate a variety of potential responses in the environment where a particular EGM is located in order to identify which ones increase play the most.

For example, if a player's responses during play of the game indicate boredom or an escalating loss of interest in the game—perhaps by hitting the buttons more slowly or with less force—the EGM can play background music more loudly or at a different tempo, increase the brightness of the screen, or otherwise attempt to re-engage the player by making the play experience more stimulating. Similarly, if the player's behavior indicates frustration, the game could slow the tempo of the music, decrease the brightness or flashiness of onscreen displays, remind the player of the odds of eventually winning, or other appropriate response which could maintain player interest while making the player less frustrated at the current state of the game. The EGM can directly provide, or be coupled to peripheral devices or systems which control, light, sound, mechanical/tactile force or other sensory conditions. Thus, when the player's detected condition deviates from a threshold or predetermined level or value, the EGM could activate or deactivate a device to generate sensory output to the player.

It will be recognized by those of ordinary skill in the art that such functions can encourage a player to keep playing an EGM for a longer period of time, thus increasing the potential revenue to the owner/operator of the gaming device. It will be further recognized that embodiments disclosed herein can provide for a more entertaining and enjoyable gaming experience to players by customizing sensory aspects of the game to suit a player's mood and/or by alerting players of potential opportunities or odds of winning prizes.

The EGM and method disclosed herein can additionally, or alternatively, be used to monitor and adjust the volatility of the game in nearly real time. Contemporaneous adjustment of a game's rules or probability structure is generally prohibited in regulated gaming jurisdictions which have existing regulations against changing the game's volatility or other rules during play. Such practice could additionally run afoul of the common regulatory prohibition of "lure," which is known as the act of awarding a player a prize purely to get him/her to keep playing, even if the game's standard rules and play have not produced a prize outcome in the recent past and the player may be becoming discouraged. However, where such regulatory restrictions do not apply, it will be recognized that embodiments of the present invention can practice the emotion monitoring and feedback system disclosed herein in order to adjust the volatility of the game. It will be recognized that such additional feature can further increase a player's enjoyment and entertainment of the game, and thus can be implemented as a potential alternative or supplemental aspect of the subject invention.

With reference now to the figures, FIG. 1 illustrates a representational view of the components of an EGM 10 according to embodiments of the subject invention. The gaming machine 10 can include a programmable processor 12 (such as for example a microprocessor or microcontroller) coupled to one or more game displays 14*a*, 14*b*. The processor 12 can include control programs 16 and associated circuitry, a user interface 18 with input/output circuits and at least one storage unit 20 which can store a plurality of instructions executable by the processor 12. The processor 12 can also include memory 22 which can include a main memory containing dynamic information processed by the processor 12 during operation, and/or a static memory which contains fixed information, such as, for example, an operating system, game programs, and a configuration of information necessary for the processor 12 to consistently process input from a player through a control array 24.

The processor 12 can execute the control programs 16 to perform primary functions for play the game, such as for example, randomly selecting game outcomes from a plurality of possible outcomes, recognizing a particular outcome as a predetermined winning or non-winning outcome and/or determining the reward amount for a particular winning outcome. The processor 12 can additionally control the game displays 14*a*, 14*b* by generating static or dynamic video for presentation thereon. The processor 12 and control programs 16 can additionally include applications for recording and/or registering the length of time it takes to play a game, or series of games, or the time interval between successive games or plays.

The control array 24 can be one or more of a keyboard, mechanical lever, a touch-screen, buttons or pads and/or any other means for control, or desired combination of controls, able to accept input from a player and produce output to the game display 14*a*, 14*b* in response to a player's input. The EGM 10 or control array 24 can additionally include one or more sensors 26 for measuring the amount of force or pressure with which is applied the control devices. Such sensors can include, for example a force or strain gauge, torque sensor, piezoelectric sensor, load cell and/or any type of force-sensing resistor which changes resistance following application of force. The sensors can be operatively coupled to the processor 12 which can register the detected amount of force and compare such detected amount to stored data, thresholds, or ranges associated with particular conditions.

Where embodiments of the subject invention are practiced or provided in connection with a wagering game, the gaming machine 10 can further include a credit input device 28, such as for example a coin or bill acceptor or card reader and a payoff device 30. The credit input device and payoff device can be operatively connected to the processor 12 and when money or other credits are deposited in connection with a game, the control program 16 can instruct the payoff device to issue an award in response to the selection of certain predetermined winning outcomes of the game. The reward or payoff can be provided in any form, including for example, coins, bills, credits, points, cards, tickets or coupons.

The EGM 10 can additionally feature lamps, lights or other luminescent devices 32 such as for example light emitting diodes ("LED"), or game top or side displays having, for example, a backlit glass marquee which can contain artwork or other static imagery relating to the game played thereon. The EGM 10 can additionally include audio transducers 34 which can emit sounds produced in connection with the game, such as for example music, dialog or other audible sound effects. Further, the EGM 10 can incorporate haptic technology 36 which can provide mechanical force feedback, such as for example, vibration or resistance to the control array 22. Such lighting devices 32, audio transducers 34 or haptic technology 36 can be operatively coupled to the EGM 10 and can be either physically located on the EGM itself or be separate from the EGM 10. The lighting devices 32, audio transducers 34 or haptic technology 35 can further be controlled by the processor 12, which can manipulate such features as the frequency and intensity of lighting effects, the selection, tempo or volume of sound effects or mechanical vibration or resistance to the user control device.

The storage unit 20 or memory 22 can contain stored data or analytics relating to at least one predetermined activity or condition (or thresholds or ranges thereof) which can be analyzed/compared to detected or measured activities or behaviors by the processor 12 and control program 16. Such stored data or analytics can be associated with certain predetermined output functions for increasing player interest. Alternatively, the processor 12 and control program 16 can contain artificial intelligence ("AI") systems for recognizing certain responses that increase interest. Thus, where the detected input or behavior differs from the stored data, the processor 12 can control the displays 14*a*, 14*b*, lighting devices 32, audio transducers 34 or other peripheral devices to implement the corresponding output/response.

The gaming machine 10 can additionally feature communication means for transmitting game data, detected conditions and information regarding sensory output conditions to a remote computer, network or display device, such as for example a remote server or computer, peripheral storage or display device or other mobile electronic device such as for example a PDA, smart phone, notebook computer or electronic tablet which can store, access and or display the transmitted data or information. Such communication means can include a communication interface 38 for communicating with such external electronic devices via wired or wireless media.

Figure 2:
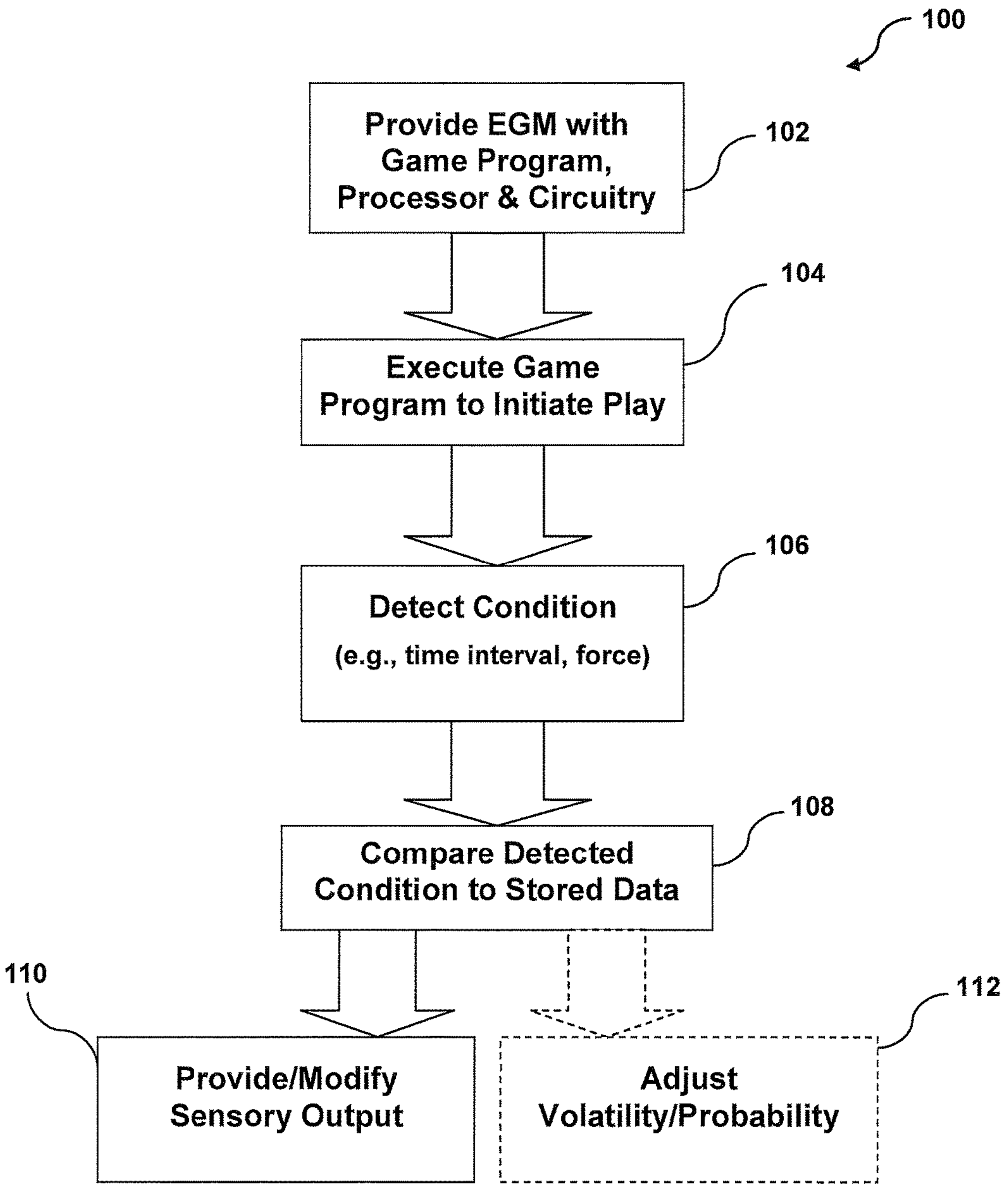
FIG. 2 is a block diagram illustrating a representational view of a method in accordance herewith.

FIG. 2 is a block diagram illustrating a method 100 for detecting a player's emotion during play and generating sensory output conditions for maintaining or improving player interest. According to such method, an electronic gaming machine can be provided 102 for execution of at least one game program. The game program can be executed 104 by an electronic processor to initiate play of the game. During play of the game, or series of games, at least one condition can be detected 106. As described above, the condition can be any event associated with the game, including for example, the amount of time between games, plays or play choices, or the amount of force applied by a player to a control device.

The EGM can contain electronically stored data or information that can associate a detected condition with a particular sensory output. Thus, the detected condition can be compared 108 to the stored data stored on the EGM and where the detected condition is associated with a particular sensory output, the predetermined sensory output can be provided or modified 110 to promote or maintain player interest.

Embodiments disclosed herein can be provided in connection with a wagering game where the outcome of the game is based, at least in part, on a random selection of at least one game outcome from a plurality of game outcomes. The plurality of outcomes can have predetermined winning and non-winning outcomes according to the rules of the game and the random selection of an individual outcome from the plurality of outcomes can be based on a set of probabilities, with certain outcomes being more likely to be selected over other outcomes. In such settings, embodiments presented herein can detect a game condition and adjust 112 the volatility or probability of the game so that certain outcomes are more or less probable than they would otherwise be according to an initial or default set of probabilities. Although such embodiments can run afoul of particular gaming regulations in regulated jurisdictions, it will be understood that such embodiments can be practiced or provided in jurisdictions where such regulations do not exist.

As will be understood by those of ordinary skill in the art, while the description above details the preferred and best mode(s) of practicing the invention, many other configurations and variations are possible. For example, the invention need not be practiced with a commercial/regulated gaming system, but could be used with a variety of coin-operated amusement devices, home gaming systems, or any other appropriate system. Accordingly, the scope of the invention should be determined not by the embodiment(s) illustrated, but by the claims below and their equivalents.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

Further, logic flows depicted in the figures do not require the particular order shown, or sequential order, to achieve desirable results. Other steps may be provided, or steps may be eliminated, from the described flows, and other components may be added to, or removed from the described embodiments.

What is claimed is:

1. An electronic gaming machine for detecting player emotion and generating sensory output comprising:

a processor, control circuitry and instructions stored on a computer readable medium, the instructions being executable by the processor to execute one or more game programs and having stored data associating a player condition with a predetermined sensory output, the sensory output being produced by the machine separately from means for accepting player input and being perceptible to a player during play of a game on the machine;

at least one electronic display device operatively connected to the processor, the electronic display device visually presenting a game played on the machine;

wherein the sensory output is selected from a group consisting of an enhancement of lighting effects of a peripheral lighting device electrically coupled to the electronic gaming machine, the enhancement of lighting effects altering a preexisting illumination of the lighting device in frequency or intensity, audio effects, alterations to a visual effect of the game presented on the electronic display device and tactile output delivered through a player input device, during execution of the game program the processor registering information regarding a detected condition, the detected condition being a physical gesture of a single player recognized by the machine during play of the game, comparing the information to the stored data and automatically implementing the sensory output where the information is associated with the predetermined sensory output where the sensory output is implemented automatically in response to the detected condition from the physical gesture of the single player and without further player input, the physical gesture being selected from a group consisting of a facial expression of the player, a time interval between a game event and a player input, and a degree of force applied to the player input device, the player emotion being associated with the detected condition of the single player;

a control array having at least one player input device;

a user interface operatively connecting the processor to the control array, and a device for providing sensory output.

2. The machine of claim 1 where the processor registers at least one time interval associated with predetermined events during execution of the game program.

3. The machine of claim 2 where the detected condition includes a time interval between successive actuations of the player input device.

4. The machine of claim 2 where the detected condition includes a time interval between presentation and selection of a play choice.

5. The machine of claim 2 where the detected condition includes a time interval between an end of a game and actuation of the player input device.

6. The machine of claim 2 where the detected condition includes a time interval between an end of a game and a start of a new game.

7. The machine of claim 1 further comprising at least one sensor for detecting the degree of force applied to the input device.

8. The machine of claim 1 where the sensory output is visual and the device for providing sensory output includes at least one of an electronic display, a lamp, lights or a light emitting diode.

9. The machine of claim 1 where the sensory output is auditory and the device for providing sensory output includes an audio transducer.

10. The machine of claim 1 where the sensory output is tactile and the device for providing sensory output includes the player input device.

11. The machine of claim 10 where the player input device features a haptic device providing mechanical force feedback.

12. The machine of claim 1 where the player input device includes at least one of a keyboard, mechanical lever, a button, switch or touch screen.

13. The machine of claim 1 where the display device comprises at least one of a CRT, LCD, plasma or LED display.

14. A method of detecting player emotion and generating sensory output comprising:

providing an electronic gaming machine for playing a game thereon;

executing a game program to initiate play of the game, the game being visually presented on an electronic display device;

registering a detected condition of an individual player during play of the game, the detected condition is recognized by the machine as being a physical gesture associated with the individual player during play of the game, the machine deriving the player emotion from the detected condition of the individual player, the physical gesture selected from a group consisting of a facial expression of the player, a time interval between a game event and a player input, and a degree of force applied to the player input device;

comparing the detected condition to stored data associated with predetermined sensory output, the sensory output being produced by the machine and perceptible to a player during play of a game on the machine, the sensory output is selected from a group consisting of an enhancement of lighting effects of a peripheral lighting device electrically coupled to the electronic gaming machine, the enhancement of lighting effects altering preexisting illumination of the lighting device in frequency or intensity, audio effects, alterations to a visual effect of the game presented on the electronic display device and tactile output delivered through a player input device, and implementing the predetermined sensory output where the detected condition is associated with the sensory output, the sensory output being automatically implemented in response to the detected condition from the physical gesture of the individual player, said sensory output being generated separately from means for accepting player input.

15. The method of claim 14 where registering a detected condition includes determining a time interval of at least one event during execution of the game program.

16. The method of claim 14 where registering a detected condition includes determining a time interval between successive actuations of a player input device.

17. The method of claim 14 where registering a detected condition includes determining a time interval between a presentation of a play choice on an electronic display and selection of a play choice.

18. The method of claim 14 where registering a detected condition includes determining a time interval between an end of a game and an actuation of a player input device.

19. The method of claim 14 where registering a detected condition includes determining a time interval between an end of a game and a start of a new game.

20. The method of claim 14 further comprising gauging a degree of force applied to a player input device.

21. The method of claim 14 where providing sensory output includes adjusting the intensity of illumination of at least one of an electronic display, a lamp, lights or a light emitting diode.

22. The method of claim 14 where providing sensory output includes selecting and playing at least one predetermined audio effect.

23. The method of claim 14 where providing sensory output includes adjusting the sound characteristics of an audio effect by at least one of altering the volume, altering the tempo, altering the pitch or altering the frequency.

24. The method of claim 14 where providing sensory output includes introducing haptic force feedback to a user control device.

25. An electronic gaming machine for detecting player emotion and generating sensory output during play of a game of chance, comprising:

a processor, control circuitry and instructions stored on a computer readable medium, the instructions being executable by the processor to execute one or more game programs and having stored data associating a player condition with a predetermined sensory output, the sensory output being produced by the machine separately from means for accepting player input and perceptible to a player during play of the game on the machine;

at least one electronic display device operatively connected to the processor, the display device visually presenting the game played on the electronic gaming machine;

wherein the sensory output is selected from a group consisting of an enhancement of lighting effects of a peripheral lighting device electrically coupled to the electronic gaming machine, the enhancement of lighting effects altering a preexisting illumination of the lighting device in frequency or intensity, audio effects, alterations to a visual effect of the game presented on the electronic display device and tactile output delivered through a player input device, during execution of the game program the instructions performing a random selection of at least one game outcome from a plurality of outcomes, the processor registering information regarding a detected condition, the detected condition being a physical gesture recognized by the machine as having been made by an individual player during play of the game, comparing the information to the stored data and automatically implementing the sensory output where the information is associated with the predetermined sensory output, the implementation of the sensory output being in response to the detected condition from the physical gesture of the individual player and without further player input, the physical gesture being selected from a group consisting of a facial expression of the player, a time interval between a game event and a player input and a degree of force exerted on the player input device, the player emotion being associated with the detected condition of the individual player;

a control array having at least one player input device, the control array operatively connected to the processor by a user interface having input/output circuits;

a device for providing the sensory output operatively coupled to the processor, and the plurality of outcomes having both predetermined winning and non-winning outcomes according to predetermined probabilities, the processor adjusting the probabilities in response to the detected condition.

26. A gaming machine comprising:

control circuits including a processor which responds to a detected physiological condition of an individual player of the gaming machine to generate a plurality of outcomes having both predetermined winning and non-winning outcomes according to predetermined probabilities, the processor adjusting the probabilities in response to the detected condition, the physiological condition being a physical gesture recognized by the machine as having been made by the individual player during play of the game, the detected physiological condition being selected from a group consisting of a facial expression of a player, a time interval between a game event and a player input, and a degree of force exerted on a player input device, the adjustment of probabilities being determined and implemented from the detected condition from the physical gesture of the individual player; and a device for providing sensory output operatively coupled to the processor when the processor adjusts the sensory output in response to the detected player condition, the sensory output being automatically produced by the machine separately from means for accepting player input and perceptible to the individual player during play of a game on the machine, the sensory output selected from a group consisting of an enhancement of lighting effects of a peripheral lighting device electrically coupled to the electronic gaming machine, the enhancement of lighting effects altering a preexisting illumination of the lighting device in frequency or intensity, audio effects, alterations to a visual effect of the game presented on the electronic display device and tactile output delivered through a player input device.

* * * * *